US008792926B2

(12) United States Patent
Isozu et al.

(10) Patent No.: US 8,792,926 B2
(45) Date of Patent: Jul. 29, 2014

(54) INFORMATION PROCESSING APPARATUS, SERVER APPARATUS, GROUP CREATION SYSTEM, GROUP CREATION METHOD, AND PROGRAM

(75) Inventors: Masaaki Isozu, Tokyo (JP); Takehiko Sasaki, Kanagawa (JP); Kazuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 13/298,947

(22) Filed: Nov. 17, 2011

(65) Prior Publication Data

US 2012/0149295 A1  Jun. 14, 2012

(30) Foreign Application Priority Data

Dec. 9, 2010  (JP) ................. 2010-274580

(51) Int. Cl.
- *H04M 3/42* (2006.01)
- *H04B 7/00* (2006.01)
- *H04M 1/00* (2006.01)

(52) U.S. Cl.
USPC ........... 455/517; 455/519; 455/518; 455/415; 455/550.1

(58) Field of Classification Search
CPC ...................................... H04W 4/06
USPC ....................................... 455/519
See application file for complete search history.

(56) References Cited

U.S. PATENT DOCUMENTS

| | | | | |
|---|---|---|---|---|
| 5,325,419 A * | 6/1994 | Connolly et al. | ........... | 455/435.1 |
| 5,506,887 A * | 4/1996 | Emery et al. | ............ | 455/461 |
| 5,742,668 A * | 4/1998 | Pepe et al. | ............ | 455/415 |
| 5,742,905 A * | 4/1998 | Pepe et al. | ............ | 455/461 |
| 6,178,331 B1 * | 1/2001 | Holmes et al. | ............ | 455/466 |
| 6,301,245 B1 * | 10/2001 | Luzeski et al. | ............ | 370/352 |
| 6,333,973 B1 * | 12/2001 | Smith et al. | ............ | 379/88.12 |
| 6,335,927 B1 * | 1/2002 | Elliott et al. | ............ | 370/352 |
| 6,618,763 B1 * | 9/2003 | Steinberg | ............ | 709/246 |
| 6,810,259 B1 | 10/2004 | Zhang | | |
| 7,631,047 B1 * | 12/2009 | Adamczyk et al. | ............ | 709/207 |
| 7,962,632 B2 * | 6/2011 | Lipsanen | ............ | 709/229 |

(Continued)

FOREIGN PATENT DOCUMENTS

JP  2009-124606  6/2009

OTHER PUBLICATIONS

"Poken", Poken Japan, Akoni KK, http://poken.jp/en/, © 2010, 1 Page.

(Continued)

*Primary Examiner* — Tilahun B Gesesse
(74) *Attorney, Agent, or Firm* — Sony Corporation

(57) ABSTRACT

Disclosed herein is a group creation system for readily creating a group of nearby information processing apparatuses to let data be exchanged easily within the group. Portable terminals A and B exchange their ID's using hello messages being broadcast to create a nearby device list each. To request creation of a group with the portable terminal B, the portable terminal A transmits a group request including the ID of the portable terminal B to a server while sending an invitation to the portable terminal B. If the portable terminal B consents to the invitation and transmits a group request to the server within a group participation allowable time, the participation of the portable terminal B in the group is finalized, and a grouping notification to that effect is transmitted from the server to the portable terminals A and B.

9 Claims, 13 Drawing Sheets

(56) References Cited

U.S. PATENT DOCUMENTS

| | | |
|---|---|---|
| 8,059,793 B2 * | 11/2011 | Shaffer et al. .............. 379/88.13 |
| 2007/0155415 A1 * | 7/2007 | Sheehy et al. ................ 455/518 |
| 2008/0219227 A1 | 9/2008 | Michaelis |
| 2010/0061294 A1 | 3/2010 | Proctor, Jr. et al. |
| 2010/0062746 A1 | 3/2010 | Proctor, Jr. et al. |
| 2010/0062758 A1 | 3/2010 | Proctor, Jr. et al. |
| 2010/0063867 A1 | 3/2010 | Proctor, Jr. et al. |
| 2010/0063889 A1 | 3/2010 | Proctor, Jr. et al. |
| 2010/0179988 A1 | 7/2010 | Nomura |
| 2011/0119733 A1 | 5/2011 | Proctor, Jr. et al. |
| 2011/0300802 A1 | 12/2011 | Proctor, Jr. et al. |
| 2011/0302014 A1 | 12/2011 | Proctor, Jr. et al. |
| 2011/0302019 A1 | 12/2011 | Proctor, Jr. et al. |

OTHER PUBLICATIONS

Extended Search Report issued Apr. 2, 2012 in European Application No. 11183167.3.

* cited by examiner

| DEVICE NAME | ID | PARENT? | MESSAGE LAST RECEIVED TIME |
|---|---|---|---|
| PORTABLE TERMINAL A | ADRESS A-201008 | 1 | 2010/08/21 10:12:50 |
| PORTABLE TERMINAL B | ADRESS B-201008 | 0 | 2010/08/21 12:20:05 |
| PORTABLE TERMINAL C | ADRESS C-201007 | 0 | 2010/08/21 10:13:25 |

FIG.9

| MESSAGE TYPE | DEVICE TYPE |
|---|---|
| TRANSMISSION SOURCE ADDRESS | TRANSMISSION DESTINATION ADDRESS |
| PARENT ADDRESS | DATE/TIME |
| ID1 | ID2 |
| ID3 | ... |
| MESSAGE ||

FIG.10

| GROUP NAME | PARTICIPATING DEVICE ID | PARENT ID | GROUP AGE |
|---|---|---|---|
| PORTABLE TERMINAL A GROUP | PORTABLE TERMINAL A(ID) | PORTABLE TERMINAL A(ID) | 7 MIN. 51 SEC. |
| | PORTABLE TERMINAL B(ID) | | |
| | PORTABLE TERMINAL C(ID) | | |
| PORTABLE TERMINAL D GROUP | PORTABLE TERMINAL D(ID) | PORTABLE TERMINAL D(ID) | 12 MIN. 30 SEC. |
| | PORTABLE TERMINAL E(ID) | | |

INFORMATION PROCESSING APPARATUS, SERVER APPARATUS, GROUP CREATION SYSTEM, GROUP CREATION METHOD, AND PROGRAM

BACKGROUND

The present disclosure relates to an information processing apparatus capable of creating a group with other information processing apparatuses, as well as to a group creation method and a program for use with such information processing apparatuses.

The widespread use of portable terminals in recent years, combined with advances in proximity wireless communication technology typified by TransferJet (registered trademark), has made it possible for a large number of users gathering at venues of events, parties and other functions to exchange large quantities of data among them using their information processing apparatuses such as portable terminals.

There exists "Poken" (discussed on the Internet), a commercially available tool allowing people to exchange their profiles easily and anywhere. Poken is a portable gadget that has its own ID stored inside. When a user's Poken is brought into contact with another user's Poken, their ID's are exchanged wirelessly therebetween.

Japanese Patent Laid-open No. 2009-124606 (called Patent Document 1 hereunder) discloses a technique relevant to a server which, based on a viewing information request sent from a content viewing apparatus, selects the users belonging to the same group and transmits viewing information corresponding to the selected users to the requesting content viewing apparatus.

SUMMARY

The techniques of the above-mentioned TransferJet and Poken typically involve users explicitly presenting their devices to each other in order to exchange their data. It follows that these techniques may not be suited for forming a large indefinite number of people into a group and letting them exchange their data within the group.

Also, the technique disclosed by the above-cited Patent Document 1 always requires the intervention of a server when data is to be shared among content viewing apparatuses. As such, the technique may not be suitable for exchanging data instantaneously between nearby apparatuses.

The present disclosure has been made in view of the above circumstances and provides an information processing apparatus, a server apparatus, a group creation system, a group creation method, and a program for readily creating a group of nearby information processing apparatuses and allowing data to be exchanged easily within that group.

According to one embodiment of the present disclosure, there is provided an information processing apparatus including: a communication portion configured to communicate with a server apparatus and another information processing apparatus over a network; and a control portion configured to control the communication portion. The control portion controls the communication portion in such a manner that, within a predetermined wireless communication range, the communication portion broadcasts a first message including first identification information identifying the own information processing apparatus while receiving a second message including second identification information which is broadcast by the other information processing apparatus and which identifies the other information processing apparatus, that, based on the received second message, the communication portion transmits to the server apparatus a third message which includes the first identification information and the second identification information and which requests creation of a group enabling desired data to be exchanged with the other information processing apparatus, that the communication portion transmits to the other information processing apparatus a fourth message requesting participation in the group, and that the communication portion receives notification information transmitted from the server apparatus saying that the creation of the group is completed in response to a fifth message which is transmitted from the other information processing apparatus to the server apparatus in response to the transmitted fourth message and which requests participation in the group.

The information processing apparatus of the above-outlined structure can easily form a group with the other information processing apparatus by simply transmitting to the server apparatus a group creation request as part of the third message including the first identification information identifying the own information processing apparatus and the second identification information which identifies the other information processing apparatus and which is received therefrom inside the predetermined wireless communication range. This grouping when completed signifies authentication of access between the own information processing apparatus and the other information processing apparatus. With the grouping completed, the two apparatuses can exchange data freely therebetween.

Preferably, the control portion may create the first identification information by combining the identification information of the own information processing apparatus with timestamp information indicative of the date and time at which the first message is broadcast.

By having the timestamp information included in the first identification information using the preferred structure above, the information processing apparatus allows the first identification information to serve as a password (key) that proves the real presence of the apparatus on the venue and prevents impersonation.

Preferably, the control portion may set a time limit limiting the time period from the time the third message is received by the server apparatus to the time the server apparatus responds to the fifth message transmitted from the other information processing apparatus.

By imposing the time limit on the participation in the group using the preferred structure above, the information processing apparatus can minimize the risk of a malicious user attempting to participate illegitimately in the group.

With the above preferred structure, the control portion may either extend the time limit or control the communication portion to transmit to the server apparatus a sixth message for setting a new time limit upon elapse of the time limit.

By extending the existing time limit or by setting a new time limit, the information processing apparatus can let a bona fide user participate in the group flexibly while preventing an illegitimate user from taking part in the group as much as possible.

According to another embodiment of the present disclosure, there is provided a server apparatus including: a communication portion configured to communicate with a first information processing apparatus and a second information processing apparatus; and a control portion configured to control the communication portion. The control portion controls the communication portion in such a manner that the communication portion receives from the first information processing apparatus a first message which includes first identification information identifying the first information processing apparatus and second identification information identifying the second information processing apparatus and which requests creation of a group enabling desired data to be exchanged between the first information processing apparatus and the second information processing apparatus, that the communication portion receives a second message from the second information processing apparatus requesting participation in the group, and that the communication portion transmits to the first information processing apparatus and the second information processing apparatus notification information notifying them that the creation of the group is completed.

According to a further embodiment of the present disclosure, there is provided a group creation system including a first information processing apparatus, a second information processing apparatus, and a server apparatus.

The first information processing apparatus includes a first communication portion configured to communicate with the server apparatus and the second information processing apparatus, and a first control portion configured to control the first communication portion. The first control portion controls the first communication portion in such a manner that, within a predetermined wireless communication range, the first communication portion broadcasts a first message including first identification information identifying the first information processing apparatus while receiving a second message including second identification information which is broadcast by the second information processing apparatus and which identifies the second information processing apparatus, that, based on the received second message, the first communication portion transmits to the server apparatus a third message which includes the first identification information and the second identification information and which requests creation of a group enabling desired data to be exchanged with the second information processing apparatus, that the first communication portion transmits to the second information processing apparatus a fourth message requesting participation in the group, and that the first communication portion receives notification information transmitted from the server apparatus saying that the creation of the group is completed in response to a fifth message which is transmitted from the second information processing apparatus to the server apparatus in response to the transmitted fourth message and which requests participation in the group.

The second information processing apparatus includes a second communication portion configured to communicate with the server apparatus and the first information processing apparatus, and a second control portion configured to control the second communication portion. The second control portion controls the second communication portion in such a manner that, within the predetermined wireless communication range, the second communication portion receives the first message while broadcasting the second message, that the second communication portion receives the fourth message from the first information processing apparatus, that the second communication portion transmits the fifth message to the server apparatus in response to the fourth message, and that the second communication portion receives the notification information from the server apparatus.

The server apparatus includes a third communication portion configured to communicate with the first information processing apparatus and the second information processing apparatus, and a third control portion configured to control the third communication portion. The third control portion controls the third communication portion in such a manner that the third communication portion receives the third message from the first information processing apparatus, that the third communication portion receives the fifth message from the second information processing apparatus, and that the third communication portion transmits the notification information to the first information processing apparatus and the second information processing apparatus.

According to an even further embodiment of the present disclosure, there is provided a group creation method for use with an information processing apparatus. The group creation method includes: broadcasting, within a predetermined wireless communication range, a first message including first identification information identifying the own information processing apparatus while receiving a second message which is broadcast by another information processing apparatus and which includes second identification information identifying the other information processing apparatus; based on the received second message, transmitting to a server apparatus a third message which includes the first identification information and the second identification information and which requests creation of a group enabling desired data to be exchanged with the other information processing apparatus; transmitting to the other information processing apparatus a fourth message requesting participation in the group; and receiving notification information transmitted from the server apparatus saying that the creation of the group is completed in response to a fifth message which is transmitted from the other information processing apparatus to the server apparatus in response to the transmitted fourth message and which requests participation in the group.

According to a still further embodiment of the present disclosure, there is provided a program for causing an information processing apparatus to perform a process. The process includes: broadcasting, within a predetermined wireless communication range, a first message including first identification information identifying the own information processing apparatus while receiving a second message which is broadcast by another information processing apparatus and which includes second identification information identifying the other information processing apparatus; based on the received second message, transmitting to a server apparatus a third message which includes the first identification information and the second identification information and which requests creation of a group enabling desired data to be exchanged with the other information processing apparatus; transmitting to the other information processing apparatus a fourth message requesting participation in the group; and receiving notification information transmitted from the server apparatus saying that the creation of the group is completed in response to a fifth message which is transmitted from the other information processing apparatus to the server apparatus in response to the transmitted fourth message and which requests participation in the group.

According to the present disclosure outlined above, it is easy to form a group of nearby information processing apparatuses and to let data be exchanged within that group.

BRIEF DESCRIPTION OF THE DRAWINGS

Further features and advantages of the present disclosure will become apparent upon a reading of the following description and appended drawings in which:

FIG. 9 is a schematic view showing a typical format of messages exchanged according to an embodiment of the present disclosure;

FIG. 10 is a tabular view showing a typical group list created and managed by the server embodying the present disclosure;

DETAILED DESCRIPTION OF THE PREFERRED EMBODIMENTS

Some preferred embodiments of the present disclosure will now be described below in reference to the accompanying drawings.

[System Overview]

Figure 1:
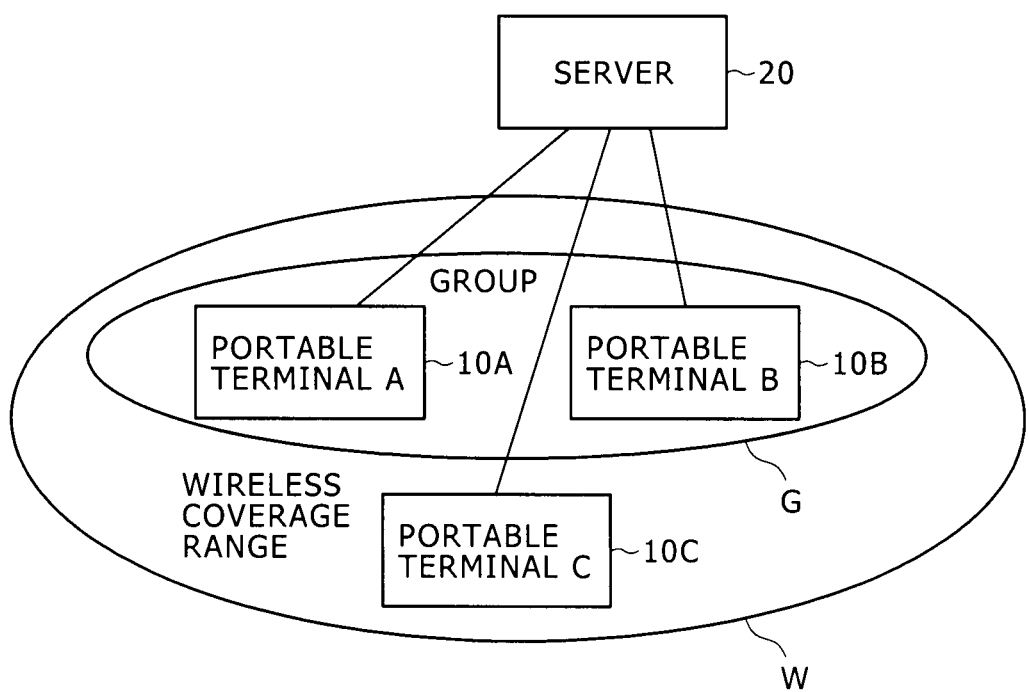
FIG. 1 is a schematic view outlining a group creation system embodying the present disclosure.

FIG. 1 is a schematic view outlining a group creation system embodying the present disclosure. As shown in FIG. 1, this group creation system is made up of a plurality of portable terminals 10 (10a through 10c, also called portable terminals A through C; ditto hereunder) and a server 20. Obviously, the number of portable terminals 10 is not limited to three. The portable terminal may be any one of mobile phones, smart phones, PDA's (Personal Digital Assistants), portable AV (audio and visual) players, electronic books, and electronic dictionaries, for example. The server 20 may be located on the Internet or on a suitable LAN (local area network).

For example, each portable terminal 10 may be carried by each of a large number of users getting together at venues of events, parties, and other gatherings attracting numerous people.

The portable terminals 10 may wirelessly communicate with one another directly without the intervention of access points within a wireless coverage range W in compliance with such wireless communication protocols as Wi-Fi (registered trademark; IEEE 802.11), Bluetooth (registered trademark; IEEE 802.15.1), and ZigBee (registered trademark; IEEE 802.15.4). Also, the portable terminals 10 are each capable of connecting with the server 20 by wired or wireless communication via access points.

With this embodiment, each portable terminal 10 can form a group with any other portable terminal 10 within the wireless coverage range by exchanging suitable data with the other portable terminal 10 and with the server 20. FIG. 1 shows the portable terminals A and B being grouped. The process of group creation will be discussed later in detail.

[Hardware Structure of the Portable Terminal]

Figure 2:
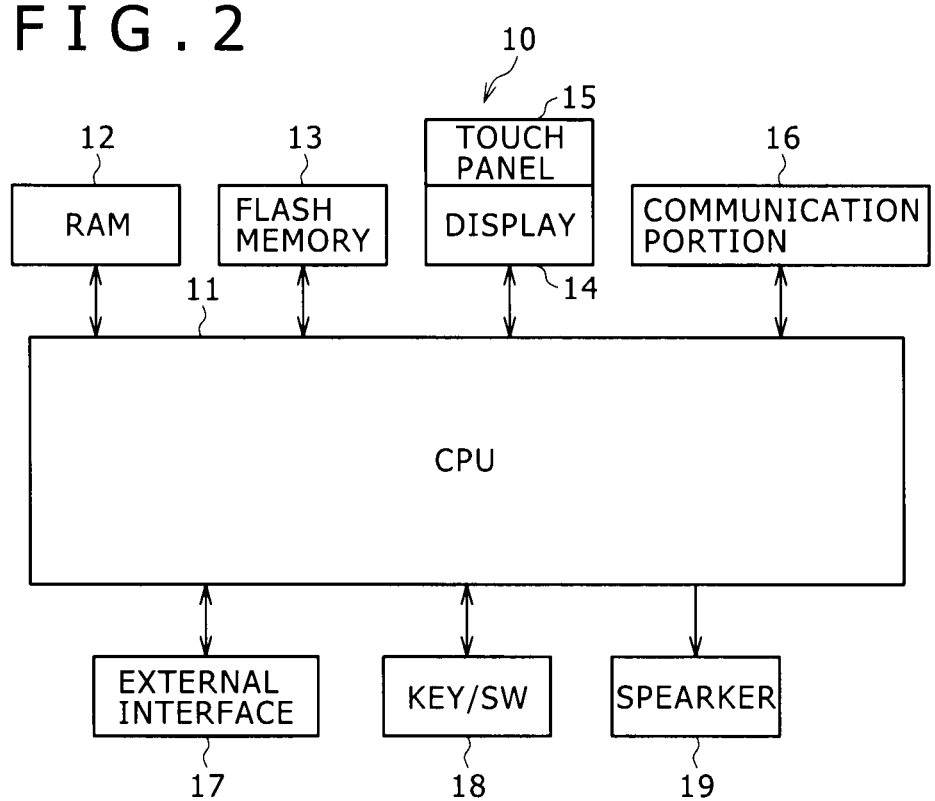
FIG. 2 is a schematic view showing a hardware structure of a portable terminal embodying the present disclosure.

FIG. 2 is a schematic view showing a hardware structure of each portable terminal 10 embodying the present disclosure.

The portable terminal 10 may include a CPU 11, a RAM 12, a flash memory 13, a display unit 14, a touch panel 15, a communication portion 16, an external interface (I/F) 17, a key/switch portion 18, and a speaker 19.

The CPU 11 performs various operations by exchanging signals with the component blocks of the portable terminal 10. The CPU 11 integrally controls the processes including the group creation process (to be discussed later) carried out by the portable terminal 10.

The RAM 12 is used as a work area of the CPU 11. As such, the RAM 12 temporarily accommodates various data being used by the CPU 11 during the above-mentioned group creation process as well as programs such as applications for executing the group creation process.

The flash memory 13 may be a NAND-type flash memory, for example. The flash memory 13 stores the data necessary for the group creation process, content such as moving images and songs, and the control programs and other programs such as applications to be executed by the CPU 11. When any of the applications is to be carried out, the flash memory 13 retrieves into the RAM 12 the diverse data necessary for application execution. Alternatively, the programs may be stored on some other suitable recording medium such as a memory card (not shown). Also, the portable terminal 10 may be provided with a hard disk drive (HDD) replacing, or in addition to, the flash memory 13.

Typically, the display unit 14 may be a liquid crystal display (LCD) or an organic electroluminescence display (OELD). As will be discussed later, the display unit 14 displays screens of the applications for executing the group creation process as well as various messages. The display unit 14 is attached integrally to the touch panel 15. The touch panel 15 detects the user's touch operations necessary for carrying out the group creation process or for exchanging content with another terminal and notifies the CPU 11 of the detected operations. For example, the operating principle of the touch panel 15 may be based on resistive touch-screen method or electrostatic capacitance method. Alternatively, the touch panel 15 may adopt any other suitable method such as electromagnetic induction method, matrix switching method, surface elastic wave method, or infrared ray radiation method as its operating principle.

The communication portion 16 is a wireless communication module that complies with such wireless communication protocols as Wi-Fi (registered trademark; IEEE 802.11), Bluetooth (registered trademark; IEEE 802.15.1), and ZigBee (registered trademark; IEEE 802.15.4). Apart from this wireless communication module, the portable terminal 10 may be furnished with a network interface card (NIC) for connecting with the server 20 by wired communication such as Ethernet (registered trademark).

The external interface 17 connects to, and exchanges data with, an external device such as a memory card in accordance with such protocols as USB (Universal Serial Bus) and HDMI (High-Definition Multimedia Interface).

The key/switch portion 18 accepts the user's operations such as power switch operations, shortcut key operations, and other operations that cannot be input through the touch panel 15, and sends input signals representative of the operations to the CPU 11.

The speaker 19 outputs audio signals that may represent content stored in the flash memory 13 or other storage or input through the communication portion 16, external interface 17, or some other entry point.

[Hardware Structure of the Server]

Figure 3:
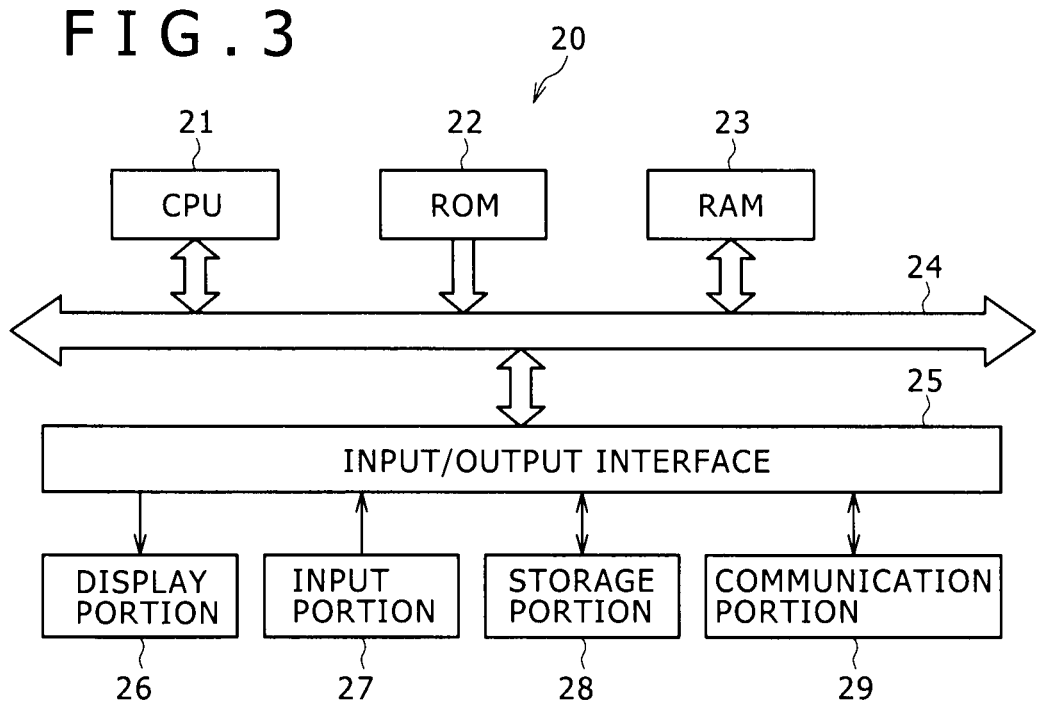
FIG. 3 is a schematic view showing a hardware structure of a server embodying the present disclosure.

FIG. 3 is a schematic view showing a hardware structure of the server 20 embodying the present disclosure. As shown in FIG. 3, the server 20 includes a CPU 21, a ROM (read only memory) 22, a RAM 23, an input/output interface 25, and a bus 24 interconnecting these components.

The CPU 21 accesses the RAM 23 and other components as needed and, while performing diverse arithmetic processes, integrally controls the entire component blocks of the server 20. The ROM 22 is a nonvolatile memory that fixedly stores firmware such as the OS and programs to be executed by the CPU 21 as well as parameters for use thereby. The RAM 23 is used as a work area or the like of the CPU 21. As such, the RAM 23 temporarily accommodates the OS and currently executing applications as well as diverse data being processed.

The input/output interface 25 is connected with a display portion 26, an input portion 27, a storage portion 28, and a communication portion 29, for example.

The display portion 26 may be a display device that may typically use an LCD, OELD, or CRT (cathode ray tube). The display portion 26 may be either incorporated in the server 20 or attached externally thereto.

The input portion 27 may be composed of a pointing device such as a mouse, a keyboard, a touch panel, and other suitable operation devices. If the input device 27 includes a touch panel, that touch panel may be formed integrally with the display portion 26.

The storage portion 28 may be formed by a nonvolatile memory such as a hard disk drive (HDD), a flash memory, or other suitable solid-state memory. The storage portion 28 stores the above-mentioned OS, diverse applications, and various data. With this embodiment in particular, the storage portion 28 stores such programs as applications for controlling the group creation process to be performed between the portable terminals 10.

The communication portion 29 may be a wireless communication module similar to the one possessed by the portable terminal 10, or a network interface card (NIC) for connecting to the Internet or to a LAN in wired fashion.

[Software Structure of the Portable Terminal]

Figure 4:
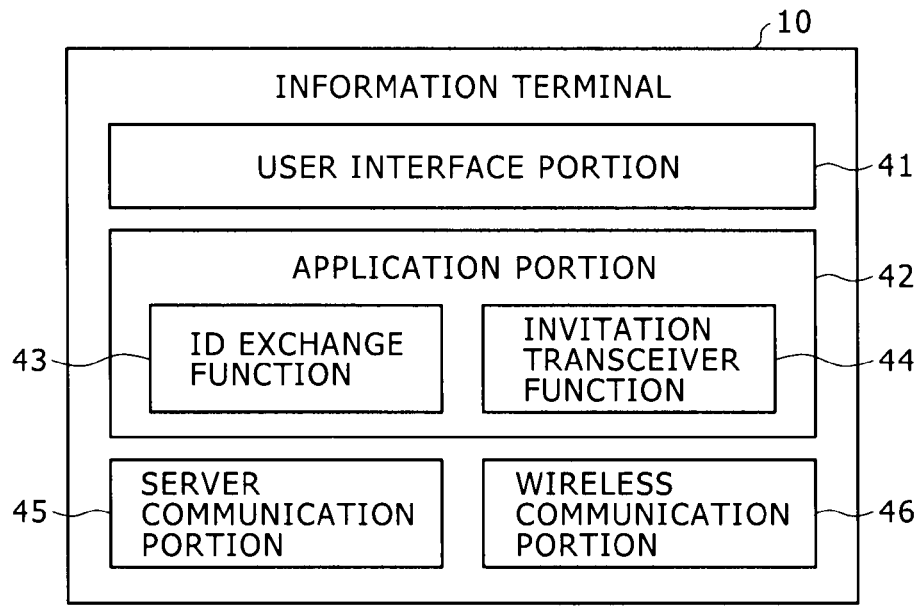
FIG. 4 is a schematic view showing a software structure of the portable terminal embodying the present disclosure.

FIG. 4 is a schematic view showing a software structure of the portable terminal 10 embodying the present disclosure. As shown in FIG. 4, the portable terminal 10 includes a user interface portion 41, an application portion 42, a server communication portion 45, and a wireless communication portion 46.

The user interface portion 41 causes the display unit 14 to display the user interface of various operation screens and the like. Also, the user interface portion 41 detects the user's operations performed on the touch panel 15 and key/switch portion 18 and informs the application portion 42 of the detected operations.

The application portion 42 includes an ID exchange function 43 and an invitation transceiver function 44. Using these functions, the application portion 42 transmits the ID identifying the portable terminal 10, transmits and receives an invitation to invite another portable terminal 10 (i.e., its user) to participate in a group, and exchanges other diverse messages with other terminals by unicast or by broadcast.

The server communication portion 45 in concert with the communication portion 16 controls wired or wireless communications with the server 20 on the Internet or on a LAN. The wireless communication portion 46 in concert with the communication portion 16 controls wireless communications with another portable terminal 10 in compliance with the above-mentioned wireless communication protocols.

[Software Structure of the Server]

Figure 5:
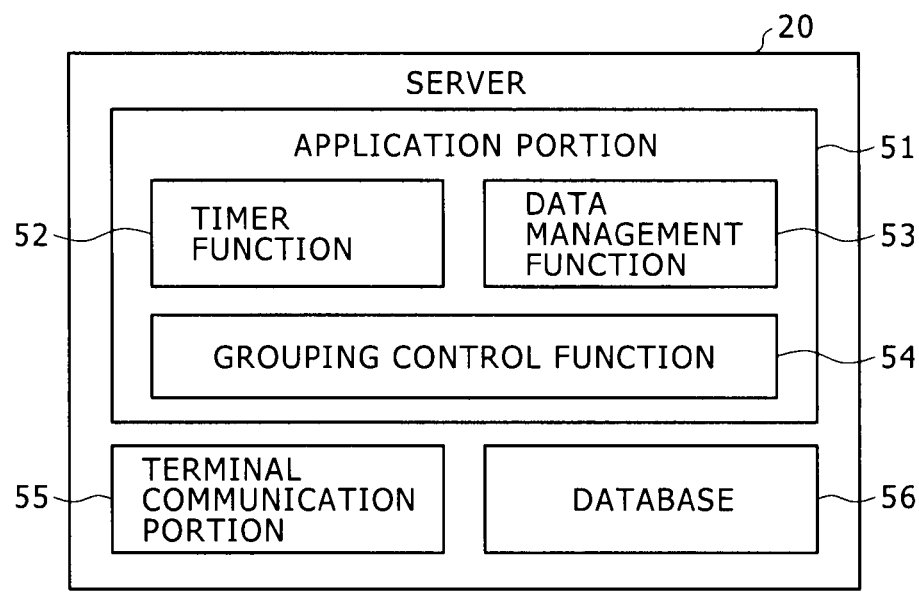
FIG. 5 is a schematic view showing a software structure of the server embodying the present disclosure.

FIG. 5 is a schematic view showing a typical structure of the software function blocks of the server 20. As shown in FIG. 5, the server 20 includes an application portion 51, a terminal communication portion 55, and a database 56.

The application portion 51 includes a timer function 52, a data management function 53, and a grouping control function 54. The timer function 52 manages a group participation allowable time, to be discussed later. The data management function 53 manages a group list (to be discussed later) and other data stored in the database 56. Using the timer function 52 and data management function 53, the grouping control function 54 controls the group creation process of each portable terminal 10, the process of adding a control terminal 10 to a group, the process of extending the set time on a timer or again setting the timer setting, and other processes.

The terminal communication portion 55 in concert with the communication portion 29 controls wired or wireless communications with each portable terminal 10.

The database 56 stores the above-mentioned group list and other data necessary for the portable terminals 10 to perform the group creation process therebetween.

[Details of the Group Creation Process]

Explained below is how each portable terminal 10 and the server 20 typically operate within the group creation system structured as described above. The ensuing description will emphasize the CPU 11 of the portable terminal 10 and the CPU 21 of the server 20 as the principal operating actors. Under control of the CPU's 11 and 21, the operations of the portable terminal 10 and of the server 20 are carried out in concert with the diverse software discussed above.

Figure 6:
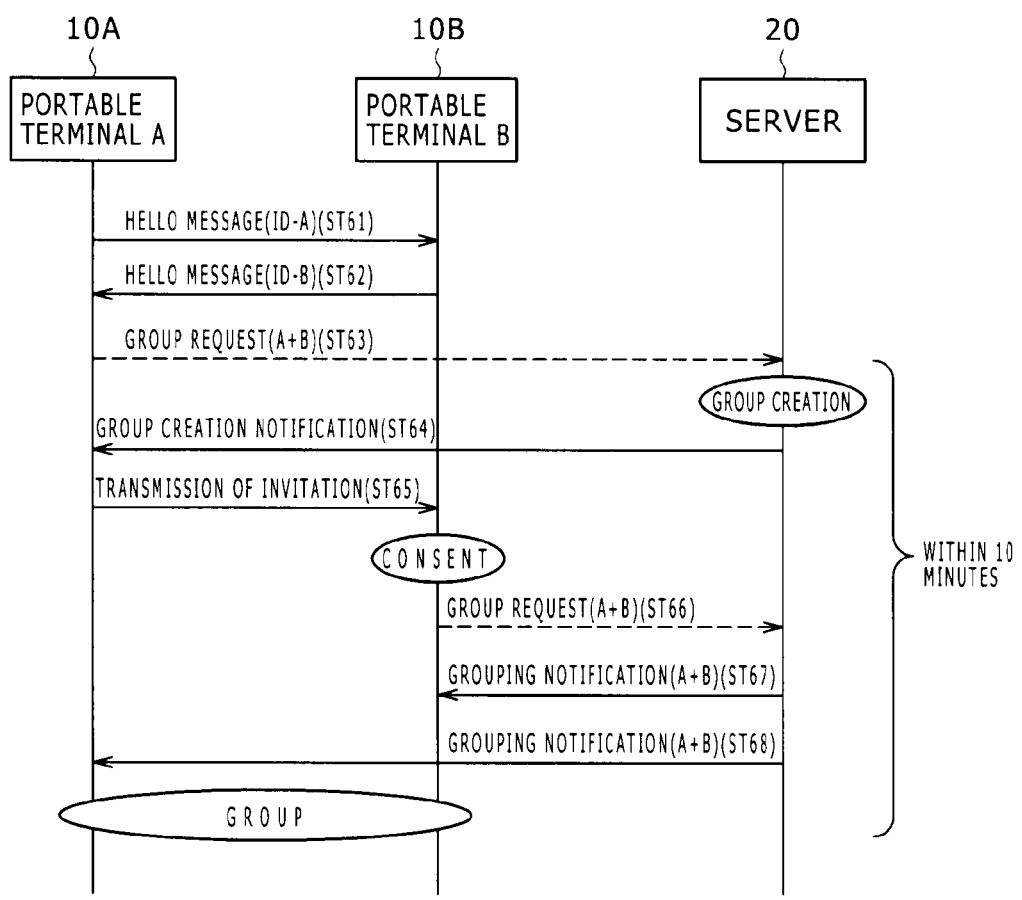
FIG. 6 is a sequence diagram showing how messages are typically exchanged among portable terminals and a server until the portable terminals are grouped according to an embodiment of the present disclosure.

FIG. 6 is a sequence diagram showing how messages are typically exchanged among portable terminals 10 and the server 20 until the portable terminals 10 are grouped according to this embodiment. Although two portable terminals A and B are shown grouped in FIG. 6, this is not limitative of the present disclosure. Alternatively, three or more portable terminals may exchange data and be grouped therebetween.

As shown in FIG. 6, the CPU 11 of each portable terminal 10 (A and B) periodically broadcasts a hello message in wireless fashion. This enables each portable terminal 10 to inform nearby devices (i.e., portable terminals 10) of its presence in the vicinity (in steps 61 and 62).

The hello message includes broadcast addresses such as the IP address of a transmission source device and the IP address of a transmission destination device, and ID's identifying the portable terminals A and B each uniquely. For example, the ID may be a combination of the MAC address of each portable terminal, its user ID, and a timestamp of the point in time at which a hello message is transmitted (i.e., generated), for example. Inserting a randomly generated character string such as the timestamp into an ID turns that ID into information that can be recognized only by the users present at the venue (of an event, a party, etc.). As a result, the ID may double as a password (encryption key).

Figures 7, 8:
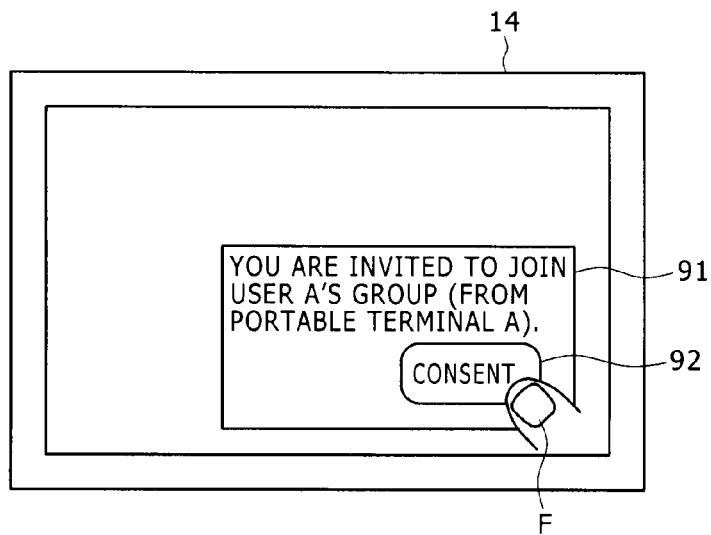
FIG. 7 is a tabular view showing a typical nearby device list created by each of the portable terminals embodying the present disclosure.
FIG. 8 is a schematic view showing a typical group invitation screen displayed on a portable terminal that has received an invitation according to an embodiment of the present disclosure.

Upon receipt of the above-mentioned hello message, the CPU 11 of each portable terminal 10 creates a nearby device list based on the ID and transmission source information contained in the hello message. FIG. 7 is a tabular view showing a typical nearby device list thus created.

As shown in FIG. 7, the nearby device list includes the device name of the portable terminal serving as the message transmission source, its ID, a flag indicative of whether the terminal is a parent or a child of the group, and the last received time of the message. As explained above, the ID combines the MAC address with the timestamp. The flag indicative of whether the portable terminal acting as the transmission source is a parent or a child of the group is set to either "0" or "1" depending on whether the transmission source portable terminal has transmitted an invitation, to be discussed later. At the time of reception or transmission of the hello message, the invitation has yet to be transmitted or received and the parent of the group has yet to be determined. Thus the flag is all "0."

Returning to FIG. 6, the CPU 11 of one of the terminals (portable terminal A in FIG. 6) transmits to the server 20 (in step 63) a group request as a message requesting the creation of a group with another portable terminal 10 (portable terminal B in FIG. 6). This group request includes the ID of the portable terminal A acting as the transmission source and the ID of the portable terminal B as a potential participant that may join the group.

More specifically, this group request serves both as a group creation request of the portable terminal possessing ID-A and as an addition-to-group request of the portable terminal B having ID-B (i.e., a request to register ID-B with the group of ID-A). Alternatively, the group creation request may be separated from the addition-to-group request, with the group creation request alone transmitted first, followed some time later by transmission of the addition-to-group request.

On receiving the group request from the portable terminal A, the CPU 21 of the server 20 creates the requested group. Specifically, the CPU 21 of the server 20 registers, among others, the ID which identifies the portable terminal serving as a potential member of the group and which is contained in the received group request, into a group list (to be discussed later). At the same time, the CPU 21 starts counting on a timer the time that has elapsed since the point in time at which the group request was received (the elapsed time is called the group age hereunder). After creating the group, the CPU 21 of the server 20 returns a group creation notification to the portable terminal A in the form of a message notifying the portable terminal A of the creation of the group (in step 64).

Upon receipt of the group creation notification, the CPU 11 of the portable terminal 10 (portable terminal A in FIG. 6) transmits an invitation requesting the participation in the group to the portable terminal 10 (portable terminal B in FIG. 6) as a potential participant in the group (in step 65).

Upon receiving the invitation, the CPU 11 of the portable terminal B causes the display unit 14 to display a group invitation screen based on the invitation. FIG. 8 shows a typical group invitation screen 91 displaying a message saying that the user of the terminal is being invited to join a group as well as a consent button 92 that expresses consent to the participation in the group if operated.

If the consent button 92 is pressed (touched) by the user's finger F, the CPU 11 of the portable terminal B transmits to the server 20 a group request serving as a message requesting the participation in the group (in step 66).

Upon receipt of the group request from the portable terminal B, the server 20 determines whether the group age counted since the reception of the group request from the portable terminal A has exceeded a predetermined time limit (called the group participation allowable time hereunder). For example, the group participation allowable time may be set, but not limited, to 10 minutes. The group participation allowable time may be determined in advance by the server 20 or may be set as desired by the portable terminal 10 acting as the group organizer. In this case, the portable terminal 10 may have the group participation allowable time included into the group request to be transmitted to the server 20.

If the group age has not exceeded the group participation allowable time, the CPU 21 of the server 20 transmits a grouping notification to the portable terminals A and B as a message notifying both terminals of their successful participation in the group (in steps 67 and 68). If the group age has exceeded the group participation allowable time, then the CPU 21 transmits the grouping notification to the terminals A and B in the form of a message notifying both terminals that the portable terminal B has failed to participate in the group (in steps 67 and 68).

When the group has been created in the above steps, that means the portable terminals 10 within the group have been authenticated for access to one another. This state allows the users of the portable terminals wirelessly to exchange diverse data including moving images, still images, and sounds as desired between their terminals.

FIG. 9 is a schematic view showing a typical format of the above-mentioned messages transmitted and received with this embodiment. As shown in FIG. 9, this format includes a message type field, a device type field, a transmission source address field, a transmission destination address field, a parent address field, a date/time field, ID fields, and a message field.

In the above-mentioned hello message, the message type field is set with "HELLO," the transmission source address field with the address of the portable terminal A, and the transmission destination address field with a broadcast address. The rest of the addresses are left unused.

In the above-mentioned invitation, the message type field is set with "INVITATION" and the device type field with "GROUP ORGANIZER." The transmission source address field and the parent address field are each set with the address of the portable terminal A, and the transmission destination address field is set with the address of the portable terminal B. The message field may contain a message as needed. This message may be input by the user of the portable terminal A through the touch panel 15.

In the group request transmitted from the portable terminal A to the server 20, the message type field is set with "GROUP REQUEST," the device type field with "GROUP ORGANIZER," the transmission source address field with the address of the portable terminal A, the transmission destination address field with the address of the server 20, the parent address field with the address of the portable terminal A, an ID1 field with the ID of the portable terminal A, and an ID2 field with the ID of the portable terminal B.

In the group request transmitted from the portable terminal B to the server 20, the message type field is set with "GROUP REQUEST," the device type field with "GROUP PARTICIPANT," the transmission source address field with the address of the portable terminal B, the transmission destination address field with the address of the server 20, the parent address field with the address of the portable terminal A, the ID1 field with the ID of the portable terminal A, and the ID2 field with the ID of the portable terminal B.

In the above-mentioned grouping notification, the message type field is set with either "GROUP PARTICIPATION SUCCEEDED" or "GROUP PARTICIPATION FAILED" depending on whether the group age has exceeded the group participation allowable time. The device type field is set with "GROUP ADMINISTRATOR," the transmission source address field with the address of the server 20, the transmission destination address field with both the address of the portable terminal A and that of the portable terminal B, the parent address field with the address of the portable terminal A, the ID1 field with the ID of the portable terminal A, and the ID2 field with the ID of the portable terminal B.

FIG. 10 is a tabular view showing a typical group list created and managed by the server 20 when a group is created. As shown in FIG. 10, the group list includes a group name field, a participating device ID field, a parent device ID field, and a group age field. In the example of FIG. 10, the portable terminal A is shown creating a group in which the portable terminals B and C participate, and a portable terminal D is shown creating a group with a portable terminal E as one of its participants. The server 20 updates the group list every time a group request is received and a new participant joins a group.

Figure 11:
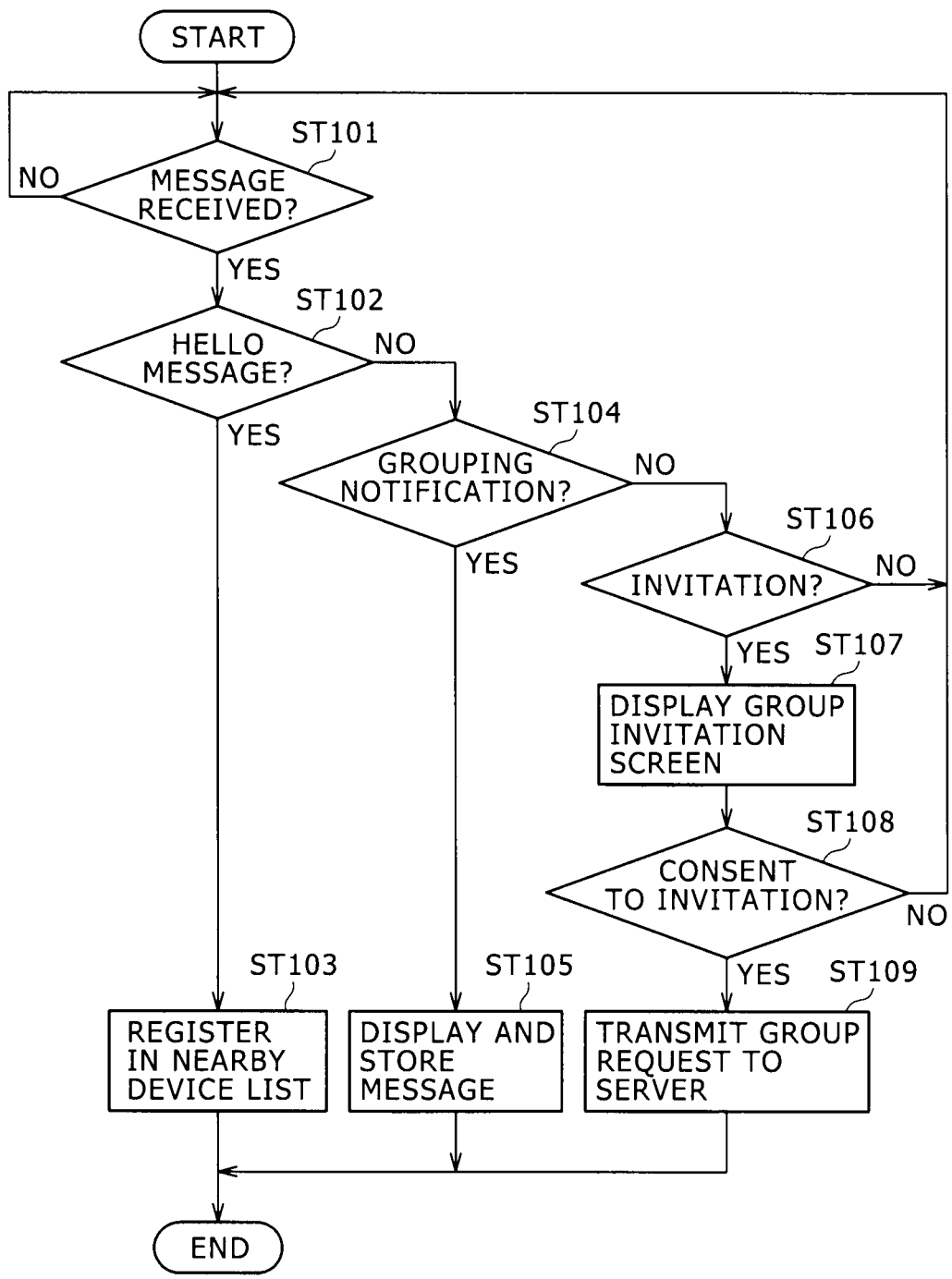
FIG. 11 is a flowchart showing a typical flow of steps performed by a portable terminal during a group creation process according to an embodiment of the present disclosure.

FIG. 11 is a flowchart showing a typical flow of steps performed by the portable terminal 10 during the above-mentioned group creation process.

As shown in FIG. 11, upon receipt of a message ("Yes" in step 101), the CPU 11 of the portable terminal 10 determines whether the received message is a hello message (in step 102).

If it is determined that the received message is a hello message ("Yes" in step 102), the CPU 11 registers into the above-mentioned nearby device list that information about the transmission source portable terminal which is found in the hello message (in step 103).

If it is determined that the received message is not a hello message ("No" in step 102), then the CPU 11 determines whether the message is a grouping notification (in step 104).

If it is determined that the received message is a grouping notification ("Yes" in step 104), the CPU 11 causes the display unit 14 to display the message in question (i.e., a message saying that a group is created with another portable terminal 10) and stores the message (in step 105).

If it is determined that the received message is not a grouping notification ("No" in step 104), the CPU 11 determines whether the received message is an invitation (in step 106).

If it is determined that the received message is an invitation ("Yes" in step 106), the CPU 11 displays the group invitation screen illustrated in FIG. 8 (in step 107).

Then the CPU 11 determines whether the consent button is pressed on the group invitation screen (in step 108). If it is determined that the consent button is pressed, the CPU 11 transmits the above-mentioned group request to the server 20 (in step 109).

If it is determined that the message is not an invitation ("No" in step 106) or that the consent button is not pressed (e.g., within a predetermined time period; "No" in step 108), then the CPU 11 returns to step 101 and waits for a new message.

Figure 12:
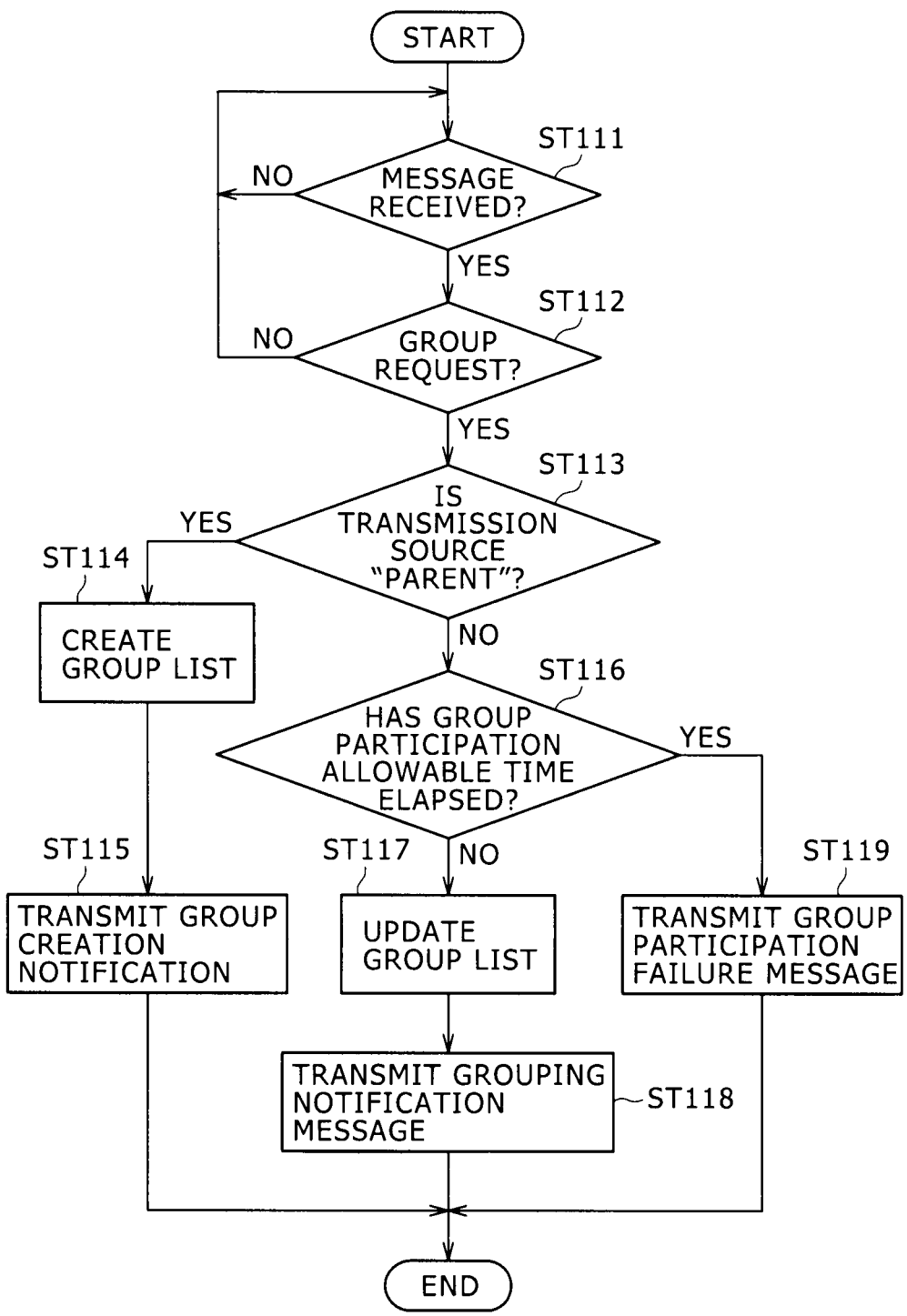
FIG. 12 is a flowchart showing a typical flow of steps performed by the server during the group creation process according to an embodiment of the present disclosure.

FIG. 12 is a flowchart showing a typical flow of steps performed by the server 20 during the above-mentioned group creation process.

As shown in FIG. 12, upon receipt of a message (in step 111), the CPU 21 of the server 20 determines whether the received message is a group request (in step 112).

If it is determined that the received message is a group request ("Yes" in 112), the CPU 21 determines whether the transmission source of the message is a parent device (i.e., group organizer; in step 113).

If it is determined that the transmission source is a parent device ("Yes" in step 113), the CPU 21 creates the above-described group list (in step 114) and transmits the above-mentioned group creation notification to the parent device (in step 115).

If it is determined that the transmission source is not a parent device (i.e., it is a child device; "No" in step 113), the CPU 21 determines whether the group age at the time the group request was received exceeds the group participation allowable time discussed above (in step 116).

If it is determined that the group age has not exceeded the group participation allowable time ("No" in step 116), the CPU 21 updates the group list in such a manner as to include the portable terminal 10 acting as the group request transmission source into the group (in step 117). Then the CPU 21 transmits the above-mentioned grouping notification indicating the successful participation in the group to the portable terminals 10 participating in the group (in step 118).

If it is determined that the group age has exceeded the group participation allowable time ("Yes" in step 116), the CPU 21 transmits the grouping notification indicating the failed participation in the group to the portable terminals 10 (in step 119).

Figure 13:
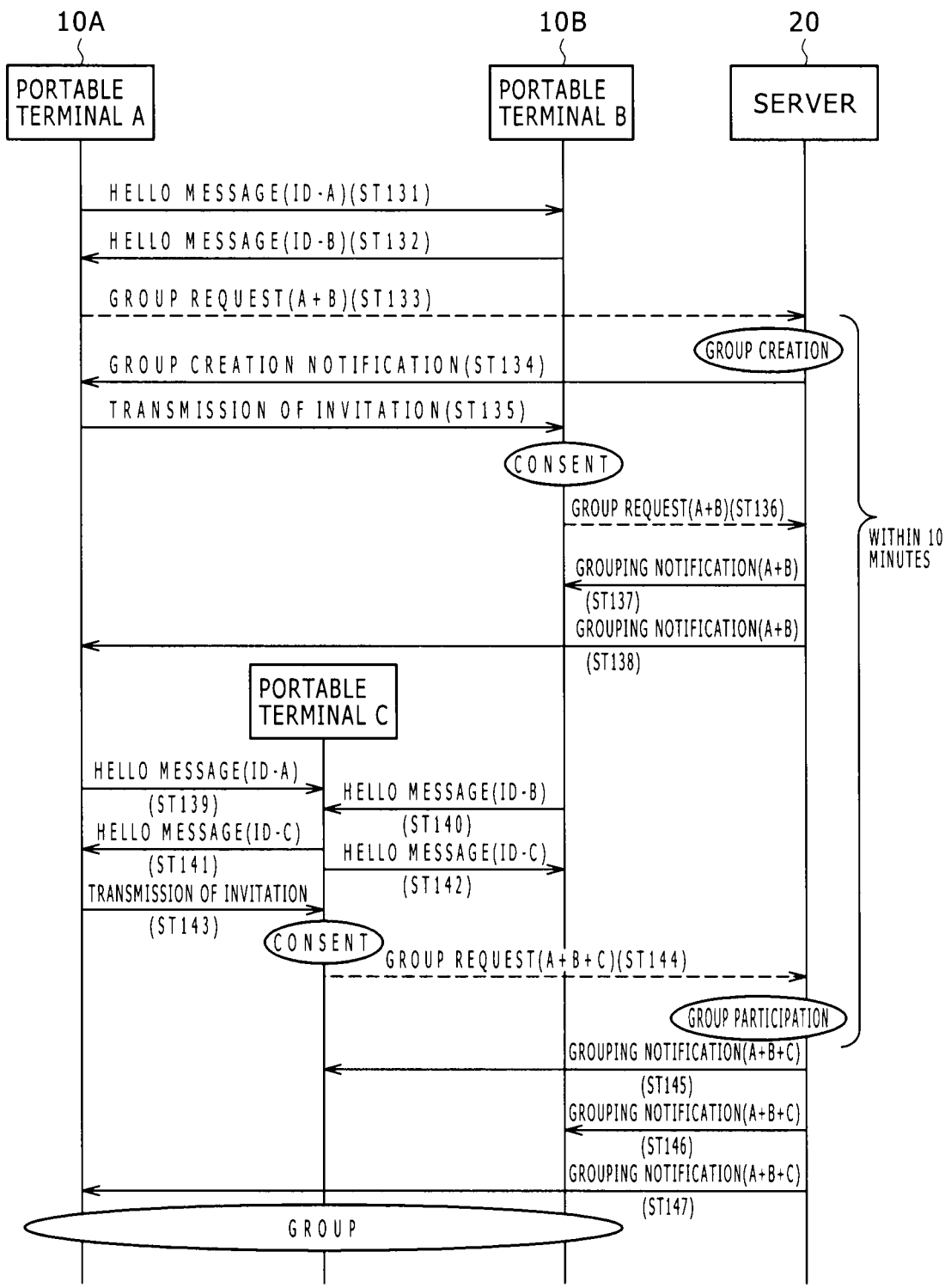
FIG. 13 is a sequence diagram showing how messages are typically exchanged when, following the creation of a group of portable terminals A and B, a portable terminal C is invited to participate in the group and the participation has succeeded according to an embodiment of the present disclosure.

FIG. 13 is a sequence diagram showing how messages are typically exchanged when, following the creation of a group of the portable terminals A and B by the process shown in FIG. 6, the portable terminal C is invited to participate in the group and the participation has succeeded.

As shown in FIG. 13, steps 131 through 138 are the same as steps 61 through 68 indicated in FIG. 6.

Thereafter, if, say, the portable terminal C enters anew the wireless coverage range W of the portable terminals A and B, or if the portable terminal C is turned on within the wireless coverage range W, then the CPU 11 of the portable terminal C and those of the portable terminals A and B exchange hello messages therebetween (in steps 139 through 142). This allows the portable terminal C to create a new nearby device list and causes the portable terminals A and B to add the portable terminal C to their nearby device lists.

The CPU 11 of the portable terminal A acting as a parent proceeds to transmit the above-mentioned invitation to the portable terminal C (in step 143).

If the consent button is pressed on the portable terminal C that has received the invitation, the portable terminal C transmits the above-mentioned group request to the server 20 (in step 144). The group request in this case includes the ID's of the portable terminals A, B and C. Although the ID of the transmission source portable terminal C and that of the parent portable terminal A are enough terminal ID's to be transmitted to the server 20 for the sole purpose of participating in the group, having the ID of the portable terminal B included in the group request proves that the user of the portable terminal C is actually present at the same venue as the users of the portable terminals A and B.

Upon receipt of the group request, if the group age is not found in excess of the group participation allowable time at that point, the server 20 updates the group list in such a manner as to let the portable terminal C participate anew in the group, and transmits to the portable terminals A, B and C a grouping notification notifying the terminals of the successful participation of the portable terminal C in the group (in steps 145 through 147).

Figure 15:
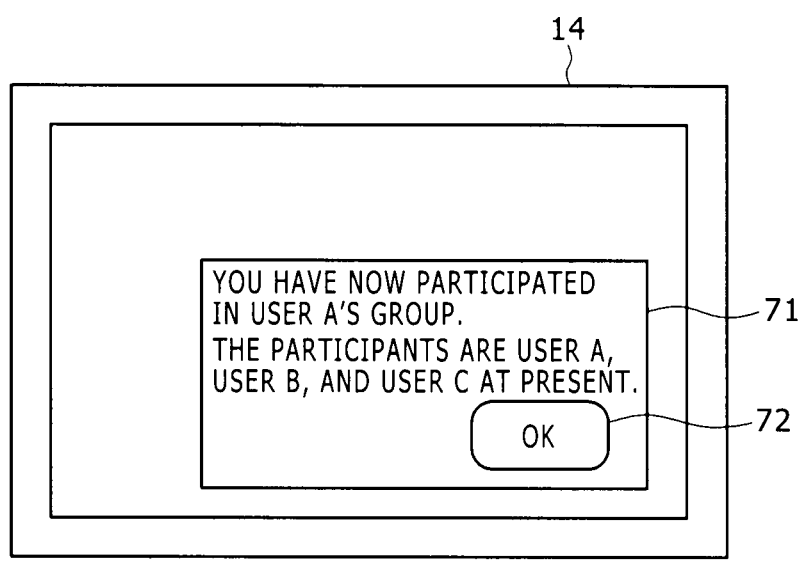
FIG. 15 is a schematic view showing a typical grouping notification screen displayed on the terminal apparatus embodying the present disclosure.

FIG. 15 is a schematic view showing a typical grouping notification screen 71 displayed on the display unit 14 of the portable terminal C. As shown in FIG. 15, the grouping notification screen 71 shows whose group the user is participating in and who are the other members of the group. The grouping notification screen 71 disappears when the user presses an OK button 72.

Figure 14:
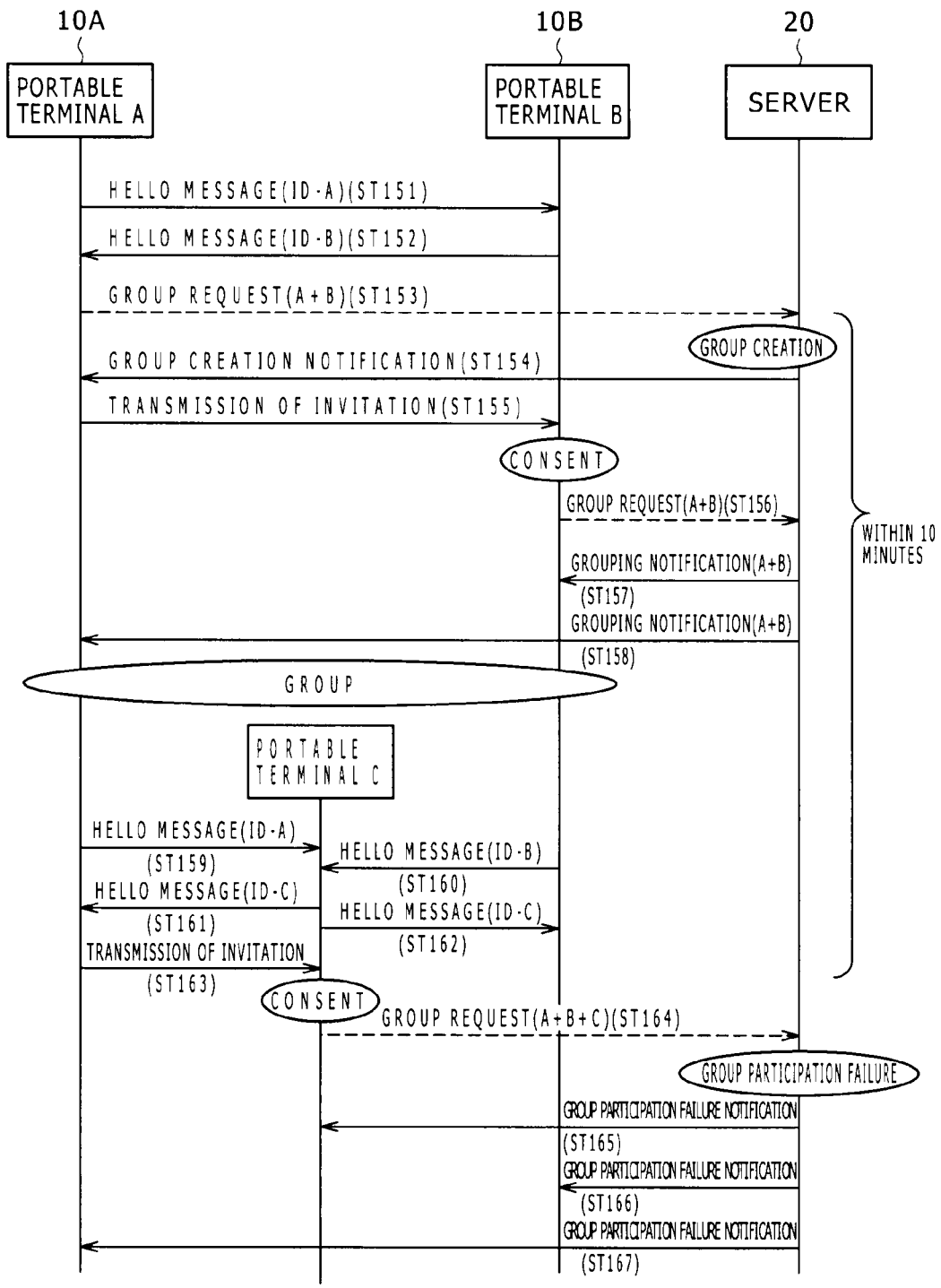
FIG. 14 is a sequence diagram showing how messages are typically exchanged when, following the creation of the group of the portable terminals A and B, the portable terminal C is invited to participate in the group but the participation has failed according to an embodiment of the present disclosure.

FIG. 14 is a sequence diagram showing how messages are typically exchanged when, following the creation of the group of the portable terminals A and B by the process depicted in FIG. 6, the portable terminal C is invited to participate in the group but the participation has failed.

As shown in FIG. 14, steps 151 through 158 are the same as steps 61 through 68 in FIG. 6 as well as the same as steps 131 through 138 in FIG. 13. Also, steps 159 through 164 in FIG. 14 are the same as steps 139 through 144 in FIG. 13.

Upon receipt of the group request, if the group age is found in excess of the group participation allowable time at that point, the server 20 transmits to the portable terminals A, B and C a grouping notification notifying the terminals of the failed participation of the portable terminal C in the group (in steps 165 through 167).

[Conclusion]

When the present disclosure is embodied as explained above, each portable terminal 10 can form a group easily with any other portable terminal 10 within the wireless communication range by simply transmitting to the server 20 a group request including its own ID as well as the ID found in the hello message received from the other portable terminal 10. Once the grouping is completed, it proves that the portable terminals 10 in the group are authenticated for access to one another. Thereafter, the terminals involved can exchange data freely therebetween.

[Variations]

It should be understood that the present disclosure when embodied is not limited to the above-described embodiment and that various modifications, variations and alternatives may be made of the disclosure so far as they are within the scope of the appended claims or the equivalents thereof.

Figure 16:
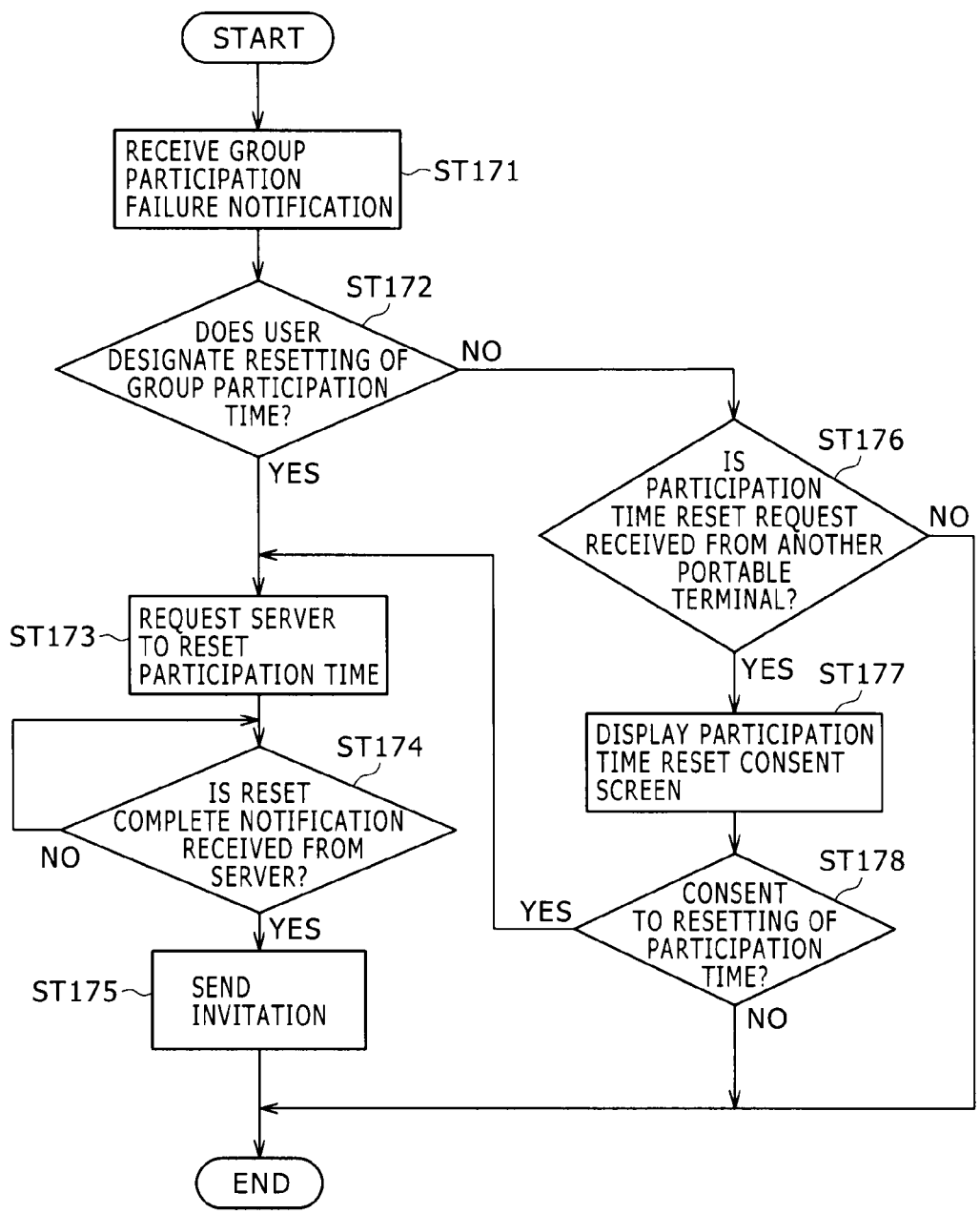
FIG. 16 is a flowchart showing a typical flow of steps performed by a portable terminal setting again a new group participation allowable time upon elapse of the current group participation allowable time as a variation of the present disclosure.
Figure 17:
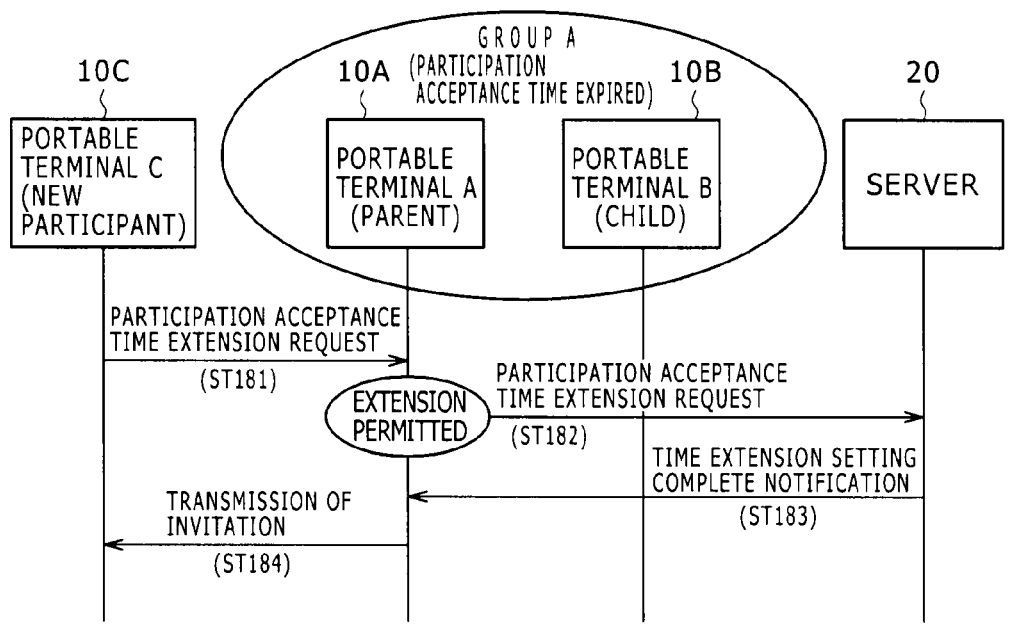
FIG. 17 is a sequence diagram showing how messages are typically exchanged among portable terminals and a server when, upon elapse of the current group participation allowable time, a new group participation allowable time is again set by the variation of the present disclosure.

For example, according to the above-described embodiment, if a child portable terminal 10 transmits a group request to the server 20 after the group participation allowable time has elapsed, the child portable terminal 10 cannot participate in the group. Alternatively, however, upon request from the parent or child portable terminal 10, the group participation allowable time may be set again. FIG. 16 is a flowchart showing a typical flow of steps performed by the parent portable terminal 10 setting again a new group participation allowable time in such a case. FIG. 17 is a sequence diagram showing how messages are typically exchanged among the portable terminals 10 and the server 20 in that case.

As shown in FIG. 16, upon receipt of a grouping notification indicating the failed participation of another portable terminal 10 (in step 171), the CPU 11 of the parent portable terminal 10 determines whether an instruction to set again the group participation allowable time is received from the other portable terminal 10 (in step 172). The instruction may typically be input by the user of the portable terminal 10 through the user interface displayed on the display unit 14 for setting again the group participation allowable time.

If it is determined that the instruction to again set the group participation allowable time is received ("Yes" in step 172), the CPU 11 transmits to the server 20 a message requesting the resetting of the group participation allowable time (in step 173 of FIG. 16; in step 182 of FIG. 17).

On receiving the message indicating the completion of the resetting from the server 20 ("Yes" in step 174 of FIG. 16; in step 183 of FIG. 17), the CPU 11 again transmits an invitation to the failed portable terminal 10 (in step 175 of FIG. 16; in step 184 of FIG. 17).

If in step S172 the user of the parent portable terminal 10 is not found giving the instruction to again set the group participation allowable time, the CPU 11 determines whether a request to again set the group participation allowable time is received (in step 176) from the other portable terminal 10 (i.e., the portable terminal 10 that failed to participate in the group).

If it is determined that the reset request is received ("Yes" in step 176 of FIG. 16; in step 181 of FIG. 17), the CPU 11 causes the display unit 14 to display a consent screen (in step 177) prompting the user to decide whether or not to consent to the reset request.

If the consent to the resetting is input through the consent screen ("Yes" in step 178), the CPU 11 transmits to the server 20 a message requesting the resetting of the group participation allowable time (in step 173 of FIG. 16; in step 182 of FIG. 17). Thereafter, the above-mentioned steps 173 through 175 are carried out.

By permitting the group participation allowable time to be set again using the steps explained above, the portable terminal 10 can let a bona fide user of another portable terminal 10 take part in the group in a flexible manner while preventing illegitimate attempts to participate in the group as much as possible.

As another variation, in steps substantially similar to those discussed above, the portable terminal 10 may extend the group participation allowable time before it elapses.

With the above-described embodiment, the group participation allowable time was shown set to 10 minutes for example. Alternatively, the group participation allowable time can be varied as needed depending on the use status of each portable terminal. For example, where the number of devices within the wireless coverage range is extremely limited such as in the individual household, the group participation allowable time may be set to several months or longer because a fairly elevated level of data security is ensured at the venue.

With the above-described embodiment, each portable terminal 10 was shown to be possessed by a different user. Alternatively, the present disclosure can be applied where a plurality of devices in the possession of a single user are to be grouped. Where one user can operate multiple devices, the group participation allowable time may be set to a very short time period (e.g., 30 seconds).

With the above-described embodiment, the server 20 was shown to start counting the group age since the time the group request was received from the group organizer (i.e., parent). Alternatively, the server 20 may start counting the group age since the time a group request is received from a first participant in the group.

With the above-described embodiment, the portable terminal A was shown to transmit an invitation to the portable terminal B after sending the group request to the server 20. Alternatively, the portable terminal A may transmit the invitation to the portable terminal B before sending the group request to the server 20.

With the above-described embodiment, the present disclosure was shown applied to the portable terminals. Alternatively, this disclosure may be applied to PC's such as laptop PC's, desk-top PC's, and tablet PC's; to digital still cameras, digital video cameras, TV sets, video game consoles, car navigation devices, recording/reproducing devices, and many other information processing apparatuses whether they are portable or stationary.

The present disclosure contains subject matter related to that disclosed in Japanese Priority Patent Application JP 2010-274580 filed in the Japan Patent Office on Dec. 9, 2010, the entire content of which is hereby incorporated by reference.

What is claimed is:

1. An information processing apparatus comprising:
a communication portion configured to communicate with a server apparatus and another information processing apparatus over a network; and
a control portion configured to control said communication portion to:
broadcast a first message comprising first identification information identifying said information processing apparatus,
receive a second message comprising second identification information, wherein said second message broadcast by said other information processing apparatus and said second message identifies said other information processing apparatus,
transmit to said server apparatus a third message, based on said received second message, wherein said third message comprises said first identification information and said second identification information and requests creation of a group between said information processing apparatus and said other information processing apparatus, wherein said group enables data to be exchanged between said information processing apparatus and said other information processing apparatus,
transmit to said other information processing apparatus a fourth message requesting participation in said group, and
receive notification information transmitted from said server apparatus in response to said transmitted fourth message, wherein said notification information notifies creation of said group in response to a fifth message which is transmitted from said other information processing apparatus to said server apparatus.

2. The information processing apparatus according to claim 1,
wherein said control portion is configured to create said first identification information that comprises timestamp information indicative of the date and time at which said first message is broadcast.

3. The information processing apparatus according to claim 1,
wherein said control portion is configured to set a time limit limiting a time period from the time said third message is received by said server apparatus to the time said server apparatus responds to said fifth message transmitted from said other information processing apparatus.

4. The information processing apparatus according to claim 3,
wherein said control portion is configured to either extend said time limit or transmit to said server apparatus a sixth message for setting a new time limit upon elapse of said time limit.

5. An information processing apparatus according to claim 1,
wherein said first identification information acts as a password to prove presence of said information processing apparatus, within a predetermined wireless communication range, to the other information processing apparatus.

6. A server apparatus comprising:
a communication portion configured to communicate with a first information processing apparatus and a second information processing apparatus; and
a control portion configured to control said communication portion to:
receive from said first information processing apparatus a first message which comprises first identification information and second identification information, wherein said first identification information identifies said first information processing apparatus and said second identification information identifies said second information processing apparatus, wherein said first message requests creation of a group between said first information processing apparatus and said second information processing apparatus, wherein said group enables data to be exchanged between said first information processing apparatus and said second information processing apparatus, wherein said first information processing apparatus transmits a second message to said second information processing apparatus requesting participation in said group,
receive a third message from said second information processing apparatus, and
transmit notification information to said first information processing apparatus and said second information processing apparatus in response to said received third message, wherein said notification information notifies creation of said group.

7. A group creation system comprising:
a first information processing apparatus, a second information processing apparatus, and a server apparatus, wherein:
said first information processing apparatus comprises:
a first communication portion configured to communicate with said server apparatus and said second information processing apparatus, and
a first control portion configured to control said first communication portion to:
broadcast a first message comprising first identification information identifying said first information processing apparatus,
receive a second message comprising second identification information, wherein said second message is broadcast by said second information processing apparatus and said second message identifies said second information processing apparatus,
transmit to said server apparatus a third message, based on said received second message, wherein said third message comprises said first identification information and said second identification information and requests creation of a group between said first information processing apparatus and said second information processing apparatus, wherein said group enables desired data to be exchanged between said first information processing apparatus and said second information processing apparatus,
transmit to said second information processing apparatus a fourth message requesting participation in said group, and
receive notification information transmitted from said server apparatus in response to said transmitted fourth message, wherein said notification information notifies creation of said group in response to a fifth message which is transmitted from said second information processing apparatus to said server apparatus;

said second information processing apparatus comprises:
a second communication portion configured to communicate with said server apparatus and said first information processing apparatus, and
a second control portion configured to control said second communication portion to:
receive said first message while broadcasting said second message,
receive said fourth message from said first information processing apparatus,
transmit said fifth message to said server apparatus in response to said received fourth message, and
receive said notification information from said server apparatus; and said server apparatus comprises:
a third communication portion configured to communicate with said first information processing apparatus and said second information processing apparatus, and
a third control portion configured to control said third communication portion to:
receive said third message from said first information processing apparatus,
receive said fifth message from said second information processing apparatus, and
transmit said notification information to said first information processing apparatus and said second information processing apparatus.

8. A group creation method for use with an information processing apparatus, said group creation method comprising:
broadcasting, a first message comprising first identification information identifying said information processing apparatus;
receiving a second message which is broadcast by another information processing apparatus and which comprises second identification information identifying said other information processing apparatus;
transmitting to a server apparatus a third message, based on said received second message, wherein said third message comprises said first identification information and said second identification information and requests creation of a group between said information processing apparatus and said other information processing apparatus, wherein said group enables data to be exchanged between said information processing apparatus and said other information processing apparatus;
transmitting to said other information processing apparatus a fourth message requesting participation in said group; and
receiving notification information transmitted from said server apparatus in response to said transmitted fourth message, wherein said notification information notifies creation of said group in response to a fifth message which is transmitted from said other information processing apparatus to said server apparatus.

9. A non-transitory computer readable medium having stored thereon, a computer program having at least one code section executable by a computer, thereby causing the computer to perform steps comprising:
broadcasting a first message comprising first identification information identifying said information processing apparatus;
receiving a second message which is broadcast by another information processing apparatus and which comprises second identification information identifying said other information processing apparatus;
transmitting to a server apparatus a third message, based on said received second message, wherein said third message comprises said first identification information and said second identification information and requests creation of a group between said information processing apparatus and said other information processing apparatus, wherein said group enables data to be exchanged between said information processing apparatus and said other information processing apparatus;
transmitting to said other information processing apparatus a fourth message requesting participation in said group; and
receiving notification information transmitted from said server apparatus in response to said transmitted fourth message, wherein said notification information notifies creation of said group in response to a fifth message which is transmitted from said other information processing apparatus to said server apparatus.

* * * * *